United States Patent

[11] 3,614,255

| | | |
|---|---|---|
| [72] | Inventor | James J. H. Rooney<br>Jonesville, N.Y. |
| [21] | Appl. No. | 876,363 |
| [22] | Filed | Nov. 13, 1969 |
| [45] | Patented | Oct. 19, 1971 |
| [73] | Assignee | General Electric Company |

[54] THRUST BALANCING ARRANGEMENT FOR STEAM TURBINE
4 Claims, 4 Drawing Figs.

[52] U.S. Cl. .................................................. 415/100, 415/107
[51] Int. Cl. ..................................................... F01d 3/02
[50] Field of Search ........................................... 415/96, 100, 104, 105, 106, 107

[56] References Cited
UNITED STATES PATENTS
902,252  10/1908  Roth ............................. 415/107

| 968,839 | 8/1910 | Ehrhart ........................ | 415/107 |
| 1,235,936 | 8/1917 | Shaw ............................ | 415/104 |
| 1,347,591 | 7/1920 | Roder ........................... | 415/107 |
| 2,300,758 | 11/1942 | Zetterquist .................. | 415/107 |

FOREIGN PATENTS
403,266  9/1909  France ......................... 415/104

Primary Examiner—C. J. Husar
Attorneys—William C. Crutcher, Frank L. Neuhauser, Oscar B. Waddell and Joseph B. Forman ABSTRACT: A thrust balancing piston in the midshaft packing of an opposed flow reheat steam turbine is supplied by a pipe connected to a downstream turbine stage. The thrust developed by the balance piston is small under normal operating conditions, but, under certain conditions of steam flow following valve closure, the piston compensates for loss of the thrust of one of the opposed flow turbine elements so as to reduce net thrust on the turbine shaft.

INVENTOR:
JAMES J.H. ROONEY.
BY W.C. Crutcher
HIS ATTORNEY.

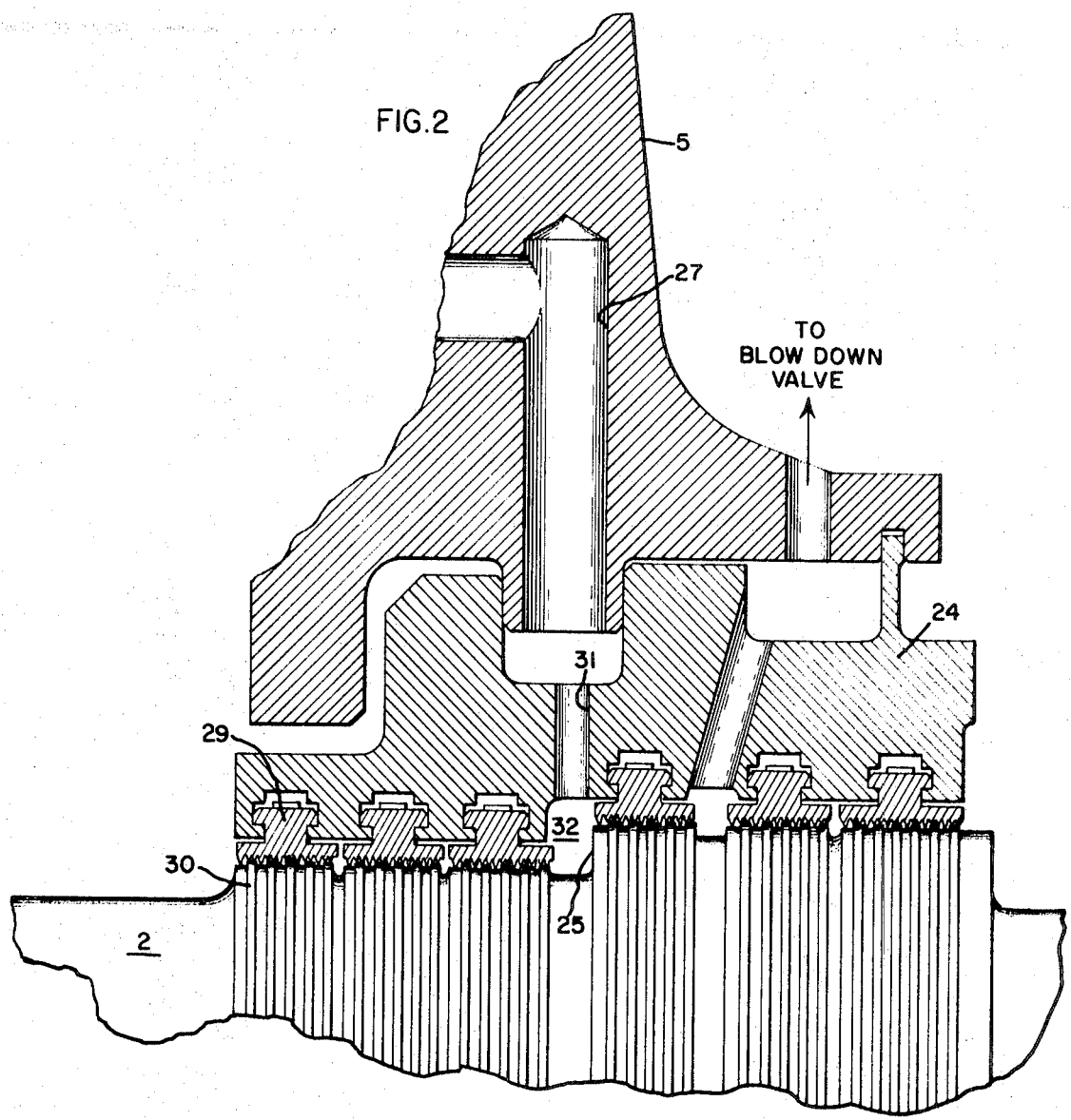

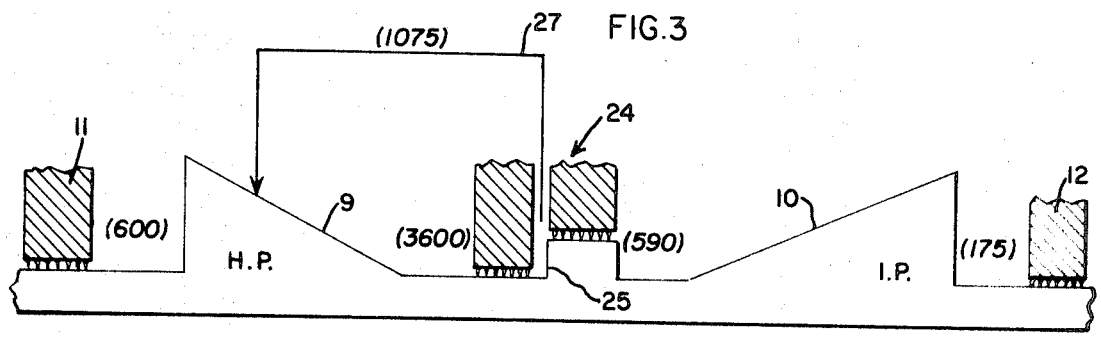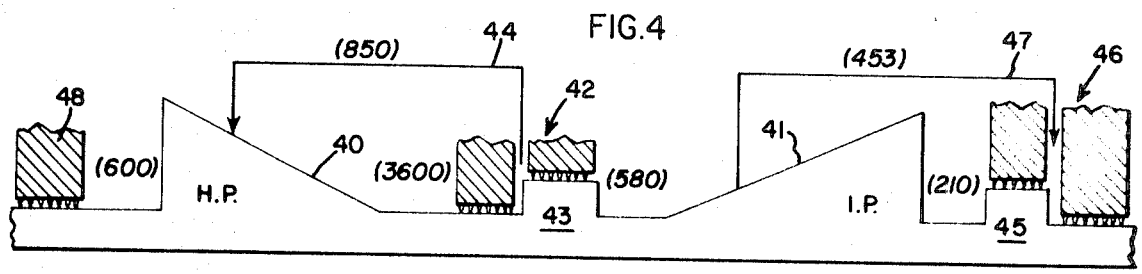

THRUST BALANCING ARRANGEMENT FOR STEAM TURBINE

BACKGROUND OF THE INVENTION

This invention relates generally to steam turbines and more particularly to reheat steam turbines of the type wherein two opposed flow turbine elements are disposed in a single casing and are supplied by two separately actuated valve sets supplying the two respective turbine elements.

Common turbine design today for reheat cycle steam turbines often utilizes an opposed flow configuration within a single casing for the high pressure and intermediate pressure turbine elements. For normal operation, this configuration is inherently almost balanced with respect to axial thrust along the shaft generated by the two opposed flow elements. The residual or net thrust developed can be carried by a thrust bearing of reasonable capacity. As the thrust bearing size increases, the frictional losses increase, and economy dictates a small thrust bearing.

Under certain conditions, the "control" valves supplying high-pressure steam to the high-pressure turbine element may remain open, while the "intercept" valves supplying reheat steam to the intermediate pressure element may close. In this event, a transiently high axial thrust will be developed by the high-pressure element, and it has been necessary to provide a thrust bearing which is large enough to accommodate this temporary phenomena. Consequently, it would be desirable to minimize the thrust bearing size so as to avoid large losses during normal operation and yet be able to accommodate the aforesaid transient conditions.

It is known in the prior art to provide a thrust balancing or "dummy" piston at the packing to compensate for axial thrust imposed in the opposite direction on the shaft due to steam flowing through the blading, as seen, for example, in U.S. Pat. No. 2,300,758. Reliable values of thrust generated by such dummy pistons depend upon predictable pressures on either side of the packing.

In an opposed flow turbine wherein two opposed turbine elements are disposed within a single casing, no thrust balancing piston is actually necessary for properly designed turbines during normal operation. However, under the previously described conditions, one of the valves admitting steam to the casing is closed while the other is open, and large unbalanced thrusts can result, requiring a large capacity thrust bearing.

Accordingly, one object of the present invention is to provide an improved thrust balancing arrangement for an opposed flow steam turbine for accommodating both normal steam flow conditions and temporary thrust increasing conditions without increasing the size of the thrust bearing.

Another object of the invention is to provide an improved thrust balancing piston within the labyrinth packing of an opposed flow steam turbine which is reliable in predicting the axial thrust generated.

DRAWING

These and many other objects of the invention will become apparent by reference to the following description, taken in connection with the accompanying drawing, in which:

FIG. 1 is an elevation drawing, the upper half being in cross section, of a reheat opposed flow steam turbine, FIG. 2 is an enlarged cross section of the midshaft labyrinth packing illustrating details of the thrust balancing piston, FIG. 3 is a simplified diagrammatic representation of the thrust forces on the FIG. 1 turbine, and FIG. 4 is a similar diagrammatic representation of a more complex arrangement of the invention.

SUMMARY OF THE INVENTION

Briefly stated, the invention is practiced by providing a piston area on the shaft portion within the labyrinth packing so as to provide a thrust balancing piston on an opposed flow steam turbine and subjecting one side of the piston to steam from a reliable pressure source such as a downstream stage pressure. The piston size and pressure source are selected to cause the thrust balancing piston to substitute the thrust lost by one of the turbine elements under transient valving conditions.

DESCRIPTION OF THE PREFERRED EMBODIMENT

Figure 1:
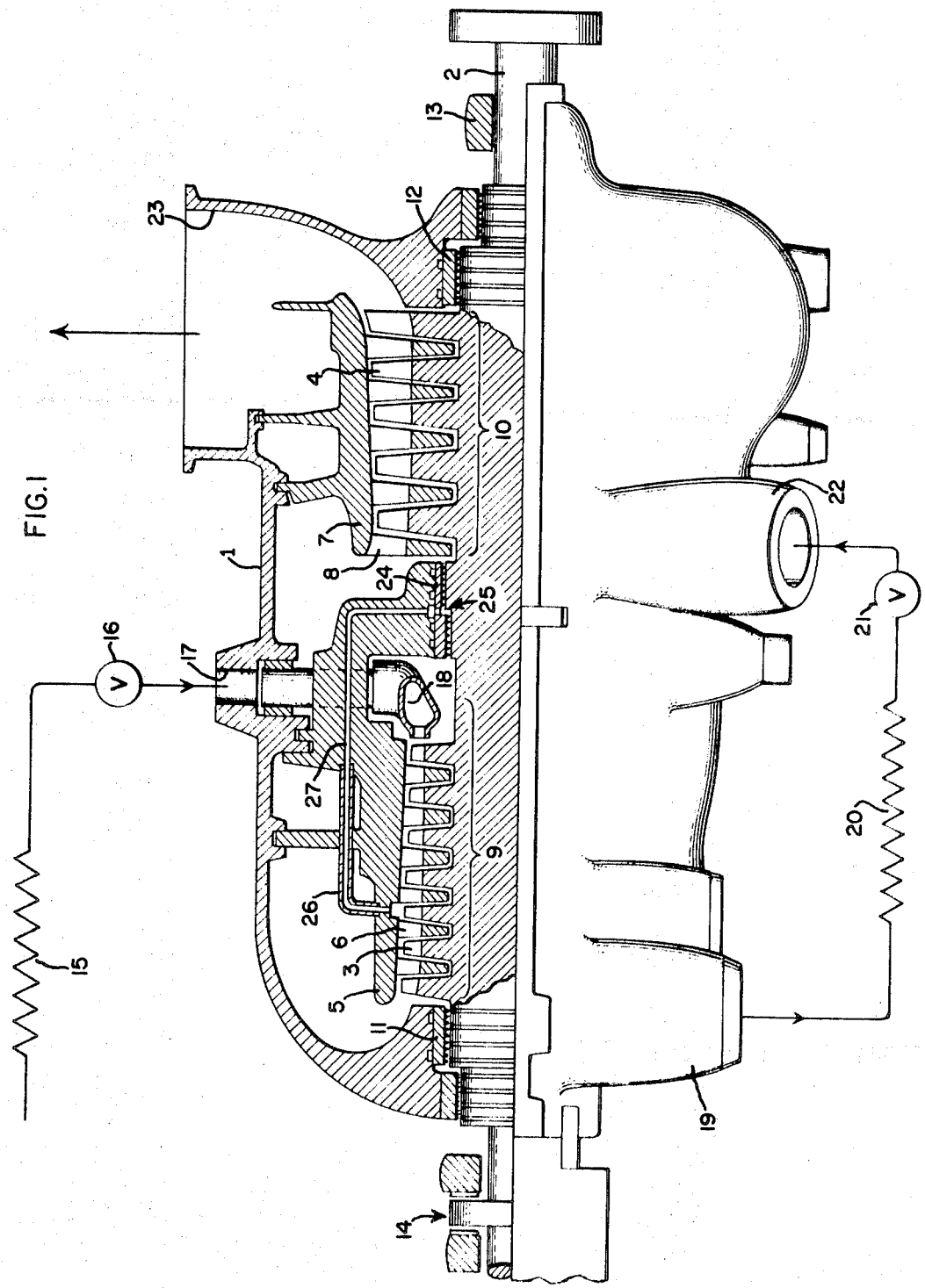

Referring to FIG. 1 of the drawing, a steam turbine outer casing 1 encloses a rotor 2 on which are disposed wheels with high-pressure blades 3 and intermediate pressure blades 4. The turbine is of the double casing type. Outer casing 1 supports and encloses an inner high pressure casing 5 carrying rows of stator blades 6 and an intermediate pressure casing 7 carrying stator blades 8. The high-pressure blades 3, 6 are arranged together in pairs to form stages; the several stages on the left together make up a high-pressure turbine element 9. Similarly, the blades 4, 8 on the right together make up an intermediate pressure turbine element 10. Elements 9, 10 are in opposed flow configuration (oppositely flowing steam paths) on the shaft 2. Conventional steam turbine labyrinth packings 11, 12 on either end prevent leakage of the steam. The turbine shaft 2 is supported by bearings, one of which is seen at 13, and the shaft thrust is taken up by a thrust bearing illustrated diagrammatically at 14. Thrust bearing 14 may be of the tapered land Kingsbury-type and is arranged to absorb shaft thrust in either direction.

Turbine casing 1 has numerous outlets for extraction steam and other functions not material to the present invention. For the purpose of understanding the present invention, it is necessary to note the travel of the main steam flow through the turbine. Superheated steam from the superheater coils 15 is introduced through stop valves and control valves indicated together symbolically by a single valve 16 connected to high-pressure inlet 17. From there it flows to the high-pressure nozzle box 18 by means on a conduit passing through the high-pressure inner casing 5. Steam flows to the left through high-pressure turbine element 9 and leaves the casing via pipe 19 to travel through a reheater 20. Steam leaving the reheater passes through the reheat stop valves and intercept valves, indicated together symbolically by a single valve 21, and reenters the turbine casing through inlet pipe 22, whereupon it flows to the right through turbine element 10 and out the exhaust 23. The exhaust steam then flows through a series of low-pressure turbine elements which are not shown and are not material to the present invention except to note that the steam pressure at outlet 23 is not at condenser vacuum, but is substantially above condenser pressure. Normally the number of stages and the relative pressures are selected so that the opposing thrusts generated by turbine elements 9, 10 are roughly balanced and any residual thrust is easily absorbed by the thrust bearing 14.

Between turbine elements 9, 10 is a midshaft labyrinth packing 24 supported by the high-pressure inner casing 5. Packing 24 is arranged to cooperate with two different diameter shaft portions separated by a step providing a thrust balancing piston area at 25. A reliable source of steam from a selected turbine stage is connected to the middle of packing 24 by means of a pipe 26 and a connecting passage 27 in the inner casing. The pressure at the turbine stage is reliably predictable.

Referring to FIG. 2 of the drawing, the details of the labyrinth with thrust balancing piston will be more clear. The packing 24 includes conventional toothed labyrinth elements 29 cooperating with lands 30 providing sealing surfaces on the shaft. However, contrary to previously known single diameter labyrinth packings, the lands are disposed at two different diameters with a radial step in-between forming a piston area 25 which, in cooperation with the other exposed shaft areas, forms a thrust balancing piston. A series of holes 31 through packing 24 provide communication between the passage 27 in the inner casing and a space 32 midway between the two labyrinth portions.

The left side of packing 24 is exposed to a high-pressure region of steam substantially at inlet pressure (see FIG. 1) while the rightnhand side is exposed to a second lower pressure region which is substantially at the reheat steam inlet pressure before it flows through turbine element 10.

In labyrinth packings, there is a gradual pressure drop as leakage steam flows through the packing. In the present invention, the turbine stage pressure tap location and the axial location of chamber 32 along the packing are selected with regard to one another so that the pressures correspond and are balance in so far as possible to reduce leakage flow between the turbine stage and the packing during normal operation.

OPERATION

Operation of the invention will be made more clear by reference to FIG. 3 wherein a diagrammatic representation is shown, with reference numerals corresponding to those in FIG. 1 and approximate steam pressures in a typical reheat opposed flow steam turbine shown by the numerals within brackets. In the lower part of the diagram, two different thrust conditions are shown, represented by arrows indicating the direction of thrust. The upper set of arrows represent thrust under normal operating conditions with both valves 16 and 21 open, the steam pressures being as indicated on the drawing. The relatively small pressure difference across the central thrust balancing piston is aiding the intermediate pressure turbine element 10.

Moving to the lower set of arrows, representing conditions which the present invention is intended to rectify, the valve 16 is open and valve 21 is closed suddenly. The high-pressure steam continues to flow through the high-pressure turbine element 9 into the reheater and out through the reheater safety valve, and this steam flow continues to generate thrust on the high-pressure element. On the other hand, the pressure across the low-pressure turbine element blades drop to condenser vacuum and there is no thrust generated. During this condition, the pressures to the left of the midshaft packing remain substantially as shown on the FIG. 3 schematic, while pressures on the right of the midshaft packing, i.e., 590 p.s.i. and 175 p.s.i., drop substantially to zero.

Under this temporary condition, the thrust caused by the intermediate pressure turbine element 10 vanishes. At the same time, however, a greater pressure difference is created across the thrust balancing piston (i.e., a difference of approximately 1,075 p.s.i. in the case shown). The additional thrust to the right caused by this increased pressure difference largely substitutes for the thrust of the intermediate turbine element 10 as indicated by the relative lengths of the arrows.

Without the thrust balancing piston, the temporary net thrust which would have to be absorbed by the thrust bearing would be quite large, i.e., on the order of 180,000 pounds for the design shown. With the aid of the thrust balancing piston, however, the unbalanced thrust under this transient valve condition is well within the capability of a thrust bearing which is designed for normal operation.

By utilizing stage pressure from the high-pressure turbine element as the source of pressure to the midshaft packing, a reliable pressure source is provided which remains relatively fixed during this temporary valve condition and insures that the thrust generated by the thrust balancing piston is predictable in value. Under normal valve conditions, the effect produced by the thrust balancing piston is relatively small.

MODIFICATION

FIG. 4 is an illustration similar to FIG. 3 showing a more complex or refined version of the invention suitable for very large turbine ratings and illustrating the versatility of the invention. In FIG. 4 a high-pressure turbine element 40 and intermediate pressure element 41 generate opposing thrusts. A midshaft labyrinth packing 42 is arranged as before with a thrust balancing piston 43 and a turbine stage pressure source 44 is connected to the center of packing 42 as previously.

In order to counterbalance the combined thrusts produced by thrust piston 43 and intermediate pressure element 41, an additional opposing thrust balancing piston 45 is provided within the shaft end packing 46. A turbine stage pressure source 47 from the intermediate pressure element 41 leads to packing 46, so that a thrust to the left is created across thrust balancing piston 45. At the other end of the shaft, a conventional shaft end packing 48 is shown (although a thrust piston could be included within this packing as well, if desired).

Referring to the arrows illustrating operation of the FIG. 4 modification, it is seen that, under normal conditions, thrust can be created to further reduce the residual thrust of the two turbine elements combined with the central thrust balancing piston. Under the I.V. closed condition when all of the steam pressures to the right of the midshaft packing drop to substantially zero pressure, the conditions are indicated by the lower set of arrows. Both thrust pistons contribute to an increase in thrust to the right. In the case of the central piston 43, the thrust is increased to the right, while in the case of the piston 45, an existing left-hand thrust is removed. In other words, in the FIG. 4 modification, both thrust pistons are arranged to reduce the residual thrust which would otherwise be imposed on the thrust bearing when valve 16 is open and valve 21 closed.

It can be seen that an improved thrust balancing arrangement has been disclosed which is particularly useful in opposed flow turbines under conditions when thrust from one of the opposed flow turbine elements is lost for a short period of time, and which generates predictable thrust values.

While there has been described herein what is considered to be the preferred embodiment of the invention, other modifications will occur to those skilled in the art, and it is intended to cover in the specification all such modifications as fall within the true spirit and scope of the invention.

I claim:
1. In an opposed flow steam turbine of the type having first and second turbine elements disposed on a shaft within a turbine casing, separately actuated first and second valves respectively admitting steam to first and second pressure regions supplying the respective turbine elements in series flow; and having a thrust bearing for absorbing residual axial shaft thrust, the improvement comprising:
   a shaft portion having two adjacent sealing surfaces of different diameters separated by a radial step defining a thrust balancing piston area,
   a labyrinth packing enclosing said shaft portion sealing surfaces and exposed at opposite ends to said first and second pressure regions, said packing defining an opening intermediate its ends communicating with said piston area,
   conduit means communicating at one end with said packing opening and connected at its other end to a third pressure region, intermediate the ends of the first turbine element, said piston area and said third pressure region being selected to reduce the unbalanced thrust on the thrust bearing created by the first turbine element when the first valve is open and the second valve is closed, and under conditions of reduced pressure in the second pressure region.

2. The combination according to claim 1, wherein said third pressure region comprises a chamber connected to a turbine stage on the first turbine element and wherein said thrust piston area is oriented to produce increased thrust opposing that of the first turbine element when pressure is reduced in said second region.

3. The combination according to claim 1, wherein a second conduit means is connected between a turbine stage in the second turbine element and a second packing, and wherein a second thrust piston supplied by the second conduit is arranged in said second packing to oppose the thrust created by said second turbine element when the first and second valves are open.

4. An opposed flow steam turbine comprising:
   an outer casing, first and second inner casings having stationary blade rows, a turbine shaft having first and second groups of rotating blade rows cooperating with the stationary blade rows to define first and second turbine elements, said elements being arranged in flow opposition on the shaft, a thrust bearing cooperating with the shaft to absorb residual axial thrust, a labyrinth packing disposed on the first inner casing and cooperating with the turbine shaft intermediate said first and second turbine elements, said packing being exposed at opposite ends to the inlet pressures of the first and second turbine elements, respectively, a shaft portion within said packing defining a step therein to provide a thrust balancing piston, and a conduit connected between a downstream stage of the first turbine element at a point intermediate the ends of said first turbine element, and communicating with said thrust piston area intermediate the ends of said packing.